United States Patent Office 3,443,762
Patented May 13, 1969

3,443,762
BURNER FOR LIQUID FUEL
Filipp Alexandrovich Lipinsky, Ulitsa Kalinina, 59, kv. 5, Ufa, U.S.S.R.
Filed Jan. 30, 1967, Ser. No. 612,650
Int. Cl. B05b 7/04, 7/10
U.S. Cl. 239—424.5                                    5 Claims

ABSTRACT OF THE DISCLOSURE

A burner for liquid fuel having a nozzle for axial delivery of atomized fuel and a swirler device mounted in proximity to the nozzle for delivery of primary combustion air. An annular cone-shaped channel encircles the outlet of the swirler device for peripheral delivery of secondary air and the cone-shaped channel includes a movable wall which is adjustable either concurrently with or relative to a movable regulating throttle which controls the amount of air admitted to the swirler device.

---

Figure 1:
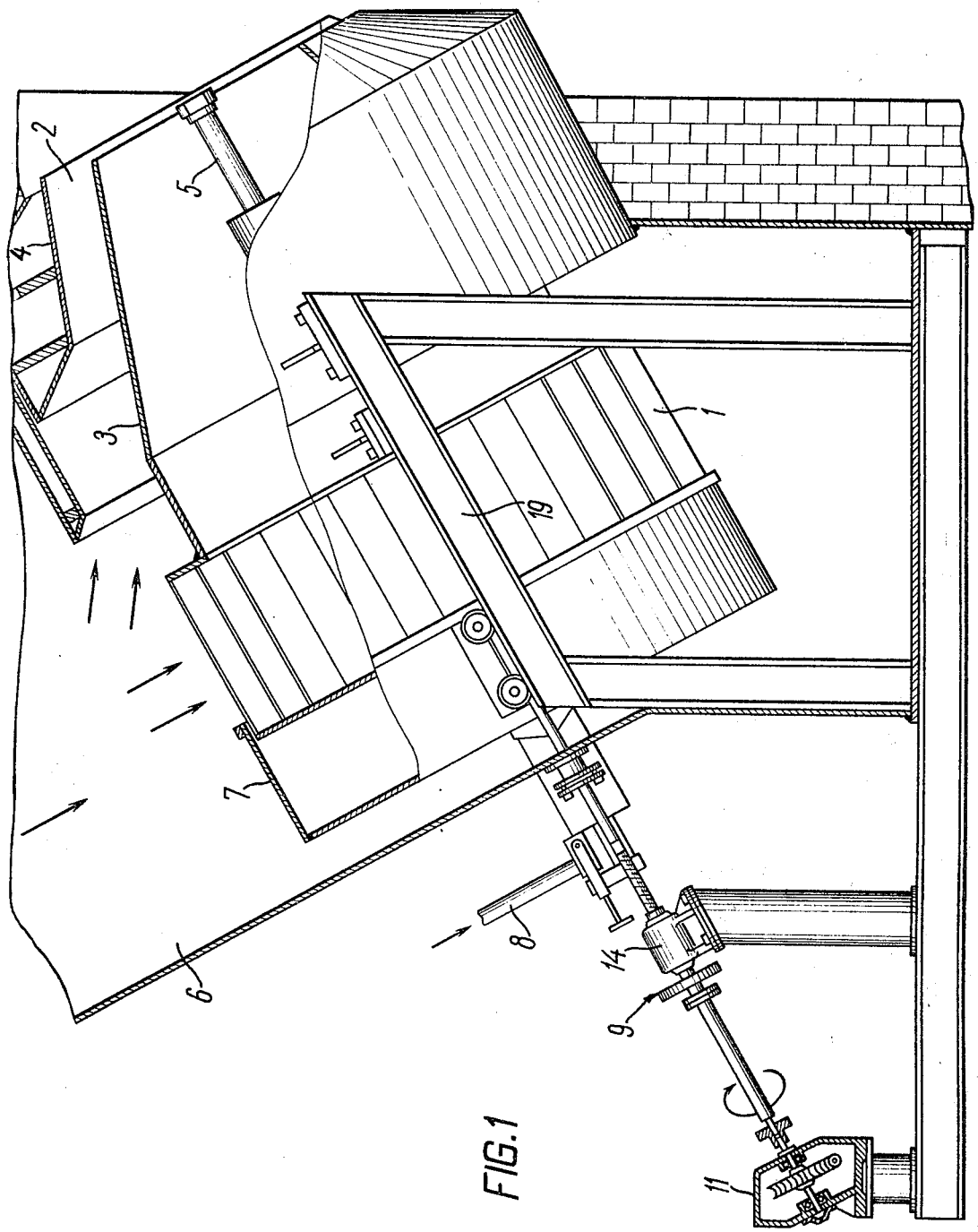

This invention relates to furnace arrangements and more particularly to burners for liquid fuel.

Known in the art are burners for liquid fuel with a central supply for fuel-air mixture through a swirler, and a peripheral supply of secondary air through an annular cone-shaped channel (whose angle of taper is about 90°) with a movable wall, said channels being concentrically arranged relative to a nozzle ensuring mechanical fuel pulverization (as described in the VGB Journal, Germany, 1964, No. 91, pp. 265–267).

The burners of the aforementioned type are intended for the employment in boiler plants using high-sulphur products as a fuel. To prevent generation of vapors of sulphuric acid and of the eutectic mixture of vanadium pentoxide and sodium sulfate, which have an adverse effect on the heating surfaces, when high sulfur fuel is being burnt the air excess factor should be maintained close to 1. To meet this requirement, the burner of a somewhat complicated design must be developed, in particular as regards the control of the burning efficiency at a relatively high rate of masout consumption.

Usually each burner is provided with an air pressure regulator installed before the burner, while the efficiency is controlled by varying the cross section area of the secondary air passageway. When optimum efficiency is attained, the ratio of primary-to-secondary air delivery is 1:1.

The main disadvantages of the burners of the aforementioned type are the limited efficiency which does not exceed 1.75 t. of fuel per hour, for each burner and a relatively small range of control.

An object of the present invention is to eliminate said disadvantages and to provide a burner for liquid fuel suitable for burning more than 10 t. of fuel per hour having a range of control in excess of 60 percent.

According to the invention, this is achieved by providing an annular cone-shaped channel having a cross-section area, ensuring the passage of 80 to 85 percent of the total amount of the air supplied for burning, the angle of taper of said channel being from 30° to 60°. The inlet of the vane guiding apparatus is provided with a movable throttle, which is connected to the movable wall and to the actuating mechanism controlling the amount of the air being admitted.

In the preferred embodiment of the burner invented by us, the movable wall of the cone-shaped channel is connected to a movable throttle which is installed at the swirler, and to the actuating mechanism of the air flow regulator, said arrangement providing for shifting the movable wall in relation to the movable throttle when the burner is being adjusted, and ensuring the concurrent movement of said wall and throttle in the course of the burner adjustment.

It is desirable that the actuating mechanism of the air flow regulator be equipped with parallel links having screw threads, said links being progressively moved by means of nuts installed in radial thrust bearings, said nuts being connected to the drive preferably by means of a toothed gearing actuating the links which are located at a considerable distance from each other.

It is desirable that the motion be imparted to the links from a common driving engine through sequential driving gears transmitting the motion from one link to another.

It is expedient to install the movable parts of the air guiding arrangement on rollers travelling along guides.

Figure 2:
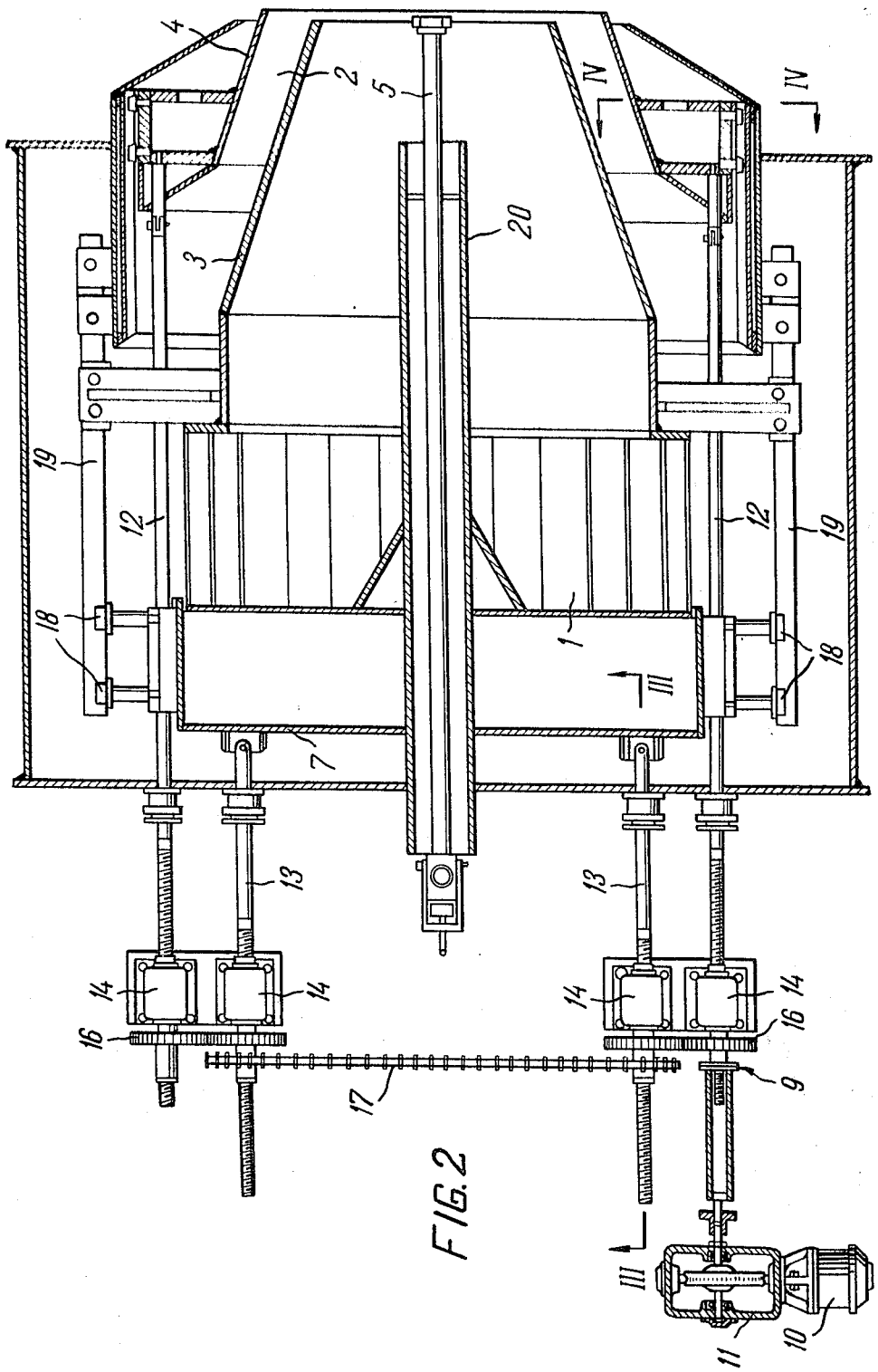
Figure 3:
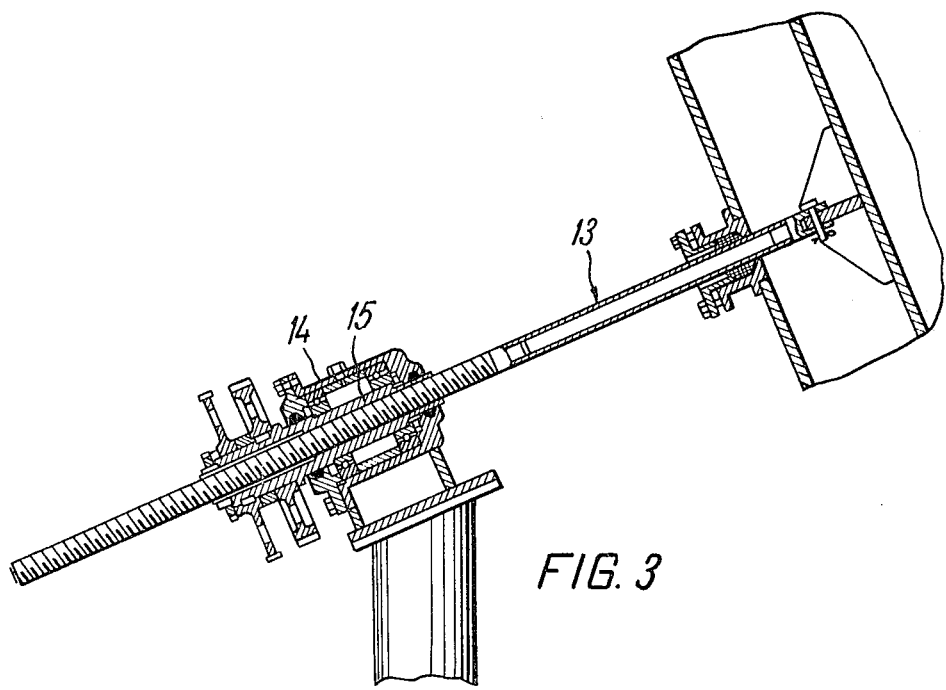
Figure 4:
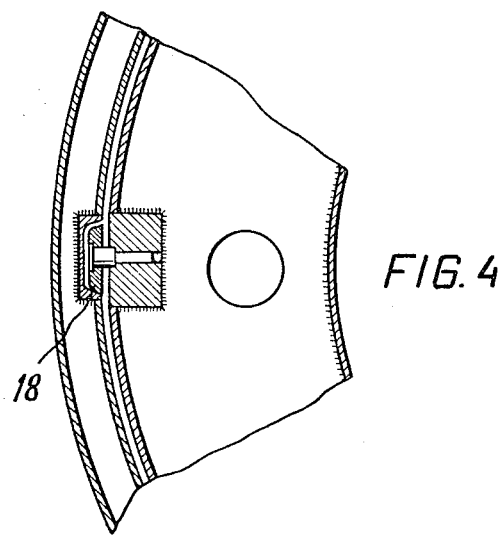

In order that the invention may be more readily understood, reference will now be made by way of example to the accompanying drawing in which:

FIG. 1 is a partial longitudinal section of the burner according to this invention;
FIG. 2 is a sectional view of the same burner;
FIG. 3 is a section taken on line III—III of FIG. 2.
FIG. 4 is a section taken on line IV—IV of FIG. 2.

The burner for liquid fuel comprises an air guiding arrangement having a swirler, which is essentially an air guiding vane apparatus 1 (FIGS. 1 and 2) and an annular cone-shaped channel 2 both formed by a stationary cone 3 and a movable wall 4. The air guiding vane apparatus 1 and the movable wall 4 are arranged concentrically relative to a nozzle 5, providing mechanical atomization of fuel and are located in a casing 6 through which the air is delivered to the burner.

The ratio of the cross-section areas of the air guiding vane apparatus 1 and the annular cone-shaped channel 2 is 1:4, whereas the angle of taper of the channel 2 is equal to 60°.

At the inlet end of the casing 6 there is a damper (not shown in the accompanying drawing), moved by an air pressure regulator (not shown in the accompanying drawing), said damper being intended for maintaining a constant pressure of air before the air guiding apparatus throughout the entire range of the burner efficiency control.

The burner efficiency is controlled by shifting a movable throttle of the air guiding vane apparatus 1, said throttle having an annular shape, and also by shifting the movable wall 4 and by varying the pressure in a fuel pipeline 8 in accordance therewith.

The movable throttle 7 and the movable wall 4 are displaced by a common system 9 of screw mechanisms driven by an electric motor 10 through a reducing worm gear 11, the electric motor 10 being controlled by a flow of air regulator (not shown in the drawing).

The movable throttle 7 and the movable wall 4 are interconnected by a hinge joint, and are connected to the reducing gear 11 through the system 9 of screw mechanisms and links 12 and 13. The ends of the links 12 and 13 are threaded and are fit into radial thrust bearings 14. The progressive motion is transferred to the links 12 and 13 by means of rotating nuts 15 (FIG. 3) set in the bearings 14. The nuts 15 are connected to the drive by means of a toothed gearing 16 to the links, which are located close to each other, as well as by means of a flexible transmission 17 to the links, which are located at a considerable distance from each other.

Both the movable throttle 7 and the movable wall 4 are mounted on rollers 18 (FIGS. 1, 2 and 4) shiftable along guides 19.

The screw mechanism system 9 is multimembered which enables the movable throttle 7 of the vane apparatus 1 to be shifted relative to the movable wall 4 of the channel 2. In case gaseous fuel is alternately used with the liquid fuel for heating the boiler, provision is made for mounting a gas burner (not shown in the accompanying drawing) inside a tube 20 (FIG. 2). The aforementioned gas burner should preferably be made in the shape of a tube and be mounted concentrically in relation to the nozzle 5.

While the present invention is described with reference to the preferred embodiment, it is understood by those skilled in the art that modifications and changes thereto may be made within the spirit and scope of the invention.

What is claimed is:

1. A burner for liquid fuel comprising a nozzle for delivery of atomized fuel, a swirler device mounted in proximity to the nozzle to deliver primary combustion air, an annular cone-shaped channel including a movable wall for peripheral delivery of secondary air, said cone-shaped channel having a cross-sectional area providing for the passage of 80 to 85 percent of the total amount of air delivered for burning, and an angle of taper from 30° to 60°, said swirler device including a movable regulating throttle for controlling the amount of air admitted to said swirler device, and an actuating mechanism coupled to said regulating throttle and to said movable wall for selective concurrent displacement thereof and for relative displacement of the wall and throttle.

2. A burner as claimed in claim 1, wherein said actuating mechanism includes threaded links arranged parallel to each other and respectively connected to said throttle and said wall, nuts supported in radial thrust bearings and connected to said links to move the same back and forth, drive means, and a toothed gearing connecting said drive means and nuts.

3. A burner as claimed in claim 2, wherein the drive means comprises a common drive device and successively arranged transmissions for transmitting motion from one link to another.

4. A burner as claimed in claim 1, wherein said throttle and movable wall include respective rollers shiftable along guides.

5. A burner for liquid fuel comprising a nozzle for delivery of atomized fuel, a swirler device mounted in proximity to the nozzle for delivery of primary combustion air, an annular cone-shaped channel mounted coaxially around said nozzle for peripheral delivery of secondary air, said channel having an angle of taper of between 30 and 60°, said channel including a pair of spaced walls one of which is supported for axial displacement relative to the nozzle and the other wall, and means for displacing said one wall to provide a cross-sectional area for the passage of 80 to 85 percent of the total amount of air for burning.

References Cited

UNITED STATES PATENTS

| 824,728 | 7/1906 | Larsen | 110—104 |
| 1,950,980 | 3/1934 | Frisch | 110—28 X |
| 2,757,721 | 8/1956 | Reed et al. | 158—1.5 |
| 2,815,069 | 12/1957 | Garraway | 239—398 X |

M. HENSON WOOD, JR., *Primary Examiner.*

MICHAEL Y. MAR, *Assistant Examiner.*

U.S. Cl. X.R.

239—428, 442, 434.5